(12) United States Patent
Ray

(10) Patent No.: US 7,432,812 B2
(45) Date of Patent: Oct. 7, 2008

(54) PASSIVE RADIO FREQUENCY DEVICE FOR MONITORING WEAR IN COMPONENTS

(75) Inventor: Elton T. Ray, Lakeville, NY (US)

(73) Assignee: Xerox Corporation, Norwalk, CT (US)

(*) Notice: Subject to any disclaimer, the term of this patent is extended or adjusted under 35 U.S.C. 154(b) by 183 days.

(21) Appl. No.: 11/412,684

(22) Filed: Apr. 26, 2006

(65) Prior Publication Data
US 2007/0252719 A1 Nov. 1, 2007

(51) Int. Cl.
*G08B 13/14* (2006.01)
(52) U.S. Cl. ............... 340/572.1; 340/652; 702/34
(58) Field of Classification Search ........... 340/572.1, 340/652, 679; 702/34; 399/9, 31; 324/754
See application file for complete search history.

(56) References Cited

U.S. PATENT DOCUMENTS

| 6,661,989 | B2 | 12/2003 | Pitts et al. | |
| 6,986,418 | B2* | 1/2006 | Swinderman et al. | 198/497 |
| 7,131,525 | B2* | 11/2006 | Swinderman et al. | 198/497 |
| 7,280,409 | B2* | 2/2007 | Brey | 340/442 |
| 2003/0230466 | A1* | 12/2003 | Swinderman et al. | 198/497 |
| 2006/0124214 | A1* | 6/2006 | Bauchot et al. | 702/34 |
| 2006/0226984 | A1* | 10/2006 | Menke | 340/572.1 |
| 2007/0103516 | A1* | 5/2007 | Wangblad | 347/64 |
| 2007/0222614 | A1* | 9/2007 | Rapp | 340/572.8 |

\* cited by examiner

*Primary Examiner*—John A Tweel, Jr.
(74) *Attorney, Agent, or Firm*—Wiggin and Dana LLP

(57) ABSTRACT

A device for monitoring wear in a component, including a radio frequency identification chip adapted to be attached with the component and a sensor configured to monitor wear of the component, the sensor being in communication with the radio frequency identification chip. The sensor may be embedded within the component and may include a plurality of circuits of varying lengths to measure different stages of wear.

16 Claims, 7 Drawing Sheets

PASSIVE RADIO FREQUENCY DEVICE FOR MONITORING WEAR IN COMPONENTS

BACKGROUND

Printer and copier machines are common in offices today. They are heavily relied upon to perform their proper function and their continued operation can be critical. In printing equipment and other office machinery, parts such as rollers, pulleys, stops and belts frequently wear out. At present, the only way to determine if a part is worn out is to wait for the part to start causing problems, or in the alternative, to frequently check each individual part.

For example, in any device that has rotating or moving parts, it is likely for a component to eventually wear out. It is difficult, if not impossible, to check every component in a machine to determine its wear level and remaining life.

When a component of a machine does wear down and break, it can cause the entire machine to stop functioning. A malfunctioning machine can result in the loss of both time and money. It would be desirable to provide a system that continuously monitors a component for wear and which signals a warning when the component has worn to a point near its end of life, preventing malfunctioning of the machine. Replacing a part before failure would result in greater machine up time and lower service costs.

BRIEF SUMMARY

According to one aspect, there is provided a device for monitoring wear in a component including a sensor and a radio frequency identification (RFID) system including a tag and an electronic reader. The sensor is configured to monitor wear in the component and is in communication with the RFID tag. The tag collects data related to wear on the component which data is read by the reader.

In another aspect, there is provided a device for monitoring wear in a component including a sensor and a radio frequency identification (RFID) tag associated with the component. The sensor may be attached to the component and may be adapted to indicate various stages of wear in the component.

In yet another aspect, there is provided a device for monitoring wear in a component including a sensor and a radio frequency identification (RFID) tag attached to the component wherein the sensor is embedded within the component and includes a plurality of electrical circuits that communicate with the tag and measure different levels of wear in the component. As the component wears down, a series of circuit connections will be broken in a sequence which in turn causes the RFID tag to return different data. This data can be read electronically by a reader on a periodic basis to determine the level of wear. As the component approaches its end of life, the reader senses this condition and a request for a service call can be initiated to replace the part.

Wireless identification systems (e.g., RFID systems) typically include two sub-assemblies: a tag (also known as a transponder) and a reader (also known as an interrogator, transceiver, or coupler). The tag is typically attached to an object, and includes, among other components, an antenna and an integrated circuit (IC) device. Stored within the IC device is information related to the object to which the tag is attached. While this information usually includes identification data for the object, it may include other information related to the object namely, in this case, data related to wear on a component of a machine.

BRIEF DESCRIPTION OF THE DRAWING

Referring now to the figures, which are exemplary embodiments, wherein like items are numbered alike.

DETAILED DESCRIPTION

Figure 1:
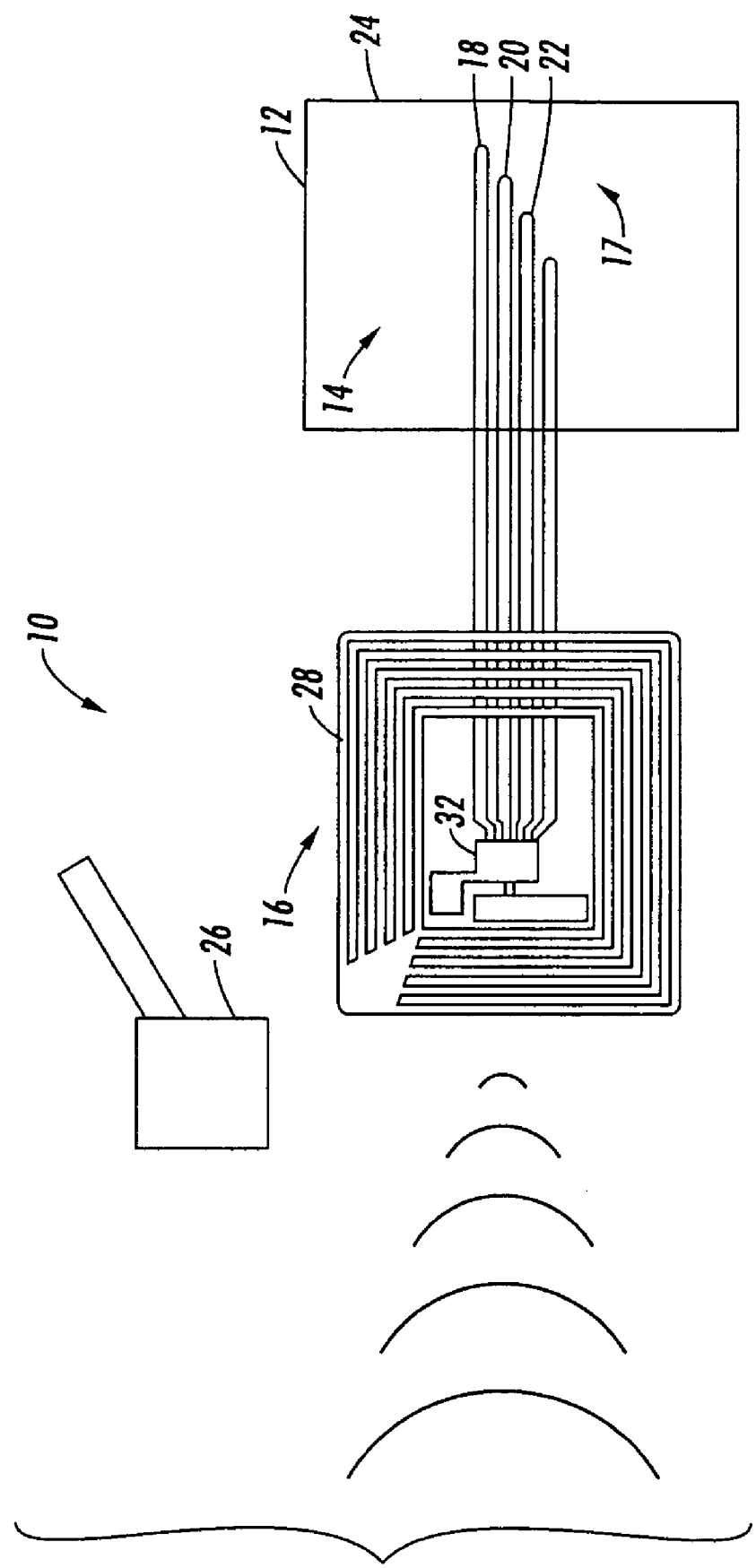
FIG. 1 is an elevational view of a device for monitoring wear in a component including a sensor and a RFID tag associated with the component.

Referring to FIG. 1, there is shown a device 10 for monitoring wear in a component 12 that is normally exposed to wear during operation of a machine. The monitoring device 10 includes a sensor 14 and a RFID tag 16. In the embodiment illustrated, sensor 14 includes a plurality of elongated, electrically conductive circuits 18, 20 and 22 which, in the illustrated embodiment, are embedded within the component 12.

The circuits 18, 20 and 22 are each of a generally elongated U-shaped configuration forming a closed loop that is connected electrically to the RFID tag 16. The circuits vary in length with the circuit 18 being the longest and closest to the outer substantially flat surface 24 of the component 12. As the component 12 wears during operation of the machine, the outer loop 17 of each circuit 18, 20 and 22 breaks and opens the circuit causing the RFID tag 16 to generate a signal. The longest circuit 18 will be the first to break, the intermediate circuit 20 will be the next to break and finally the shortest circuit 22 will be the last to break in a sequence that indicates or measures the degree of wear on the component 12.

Figure 2:
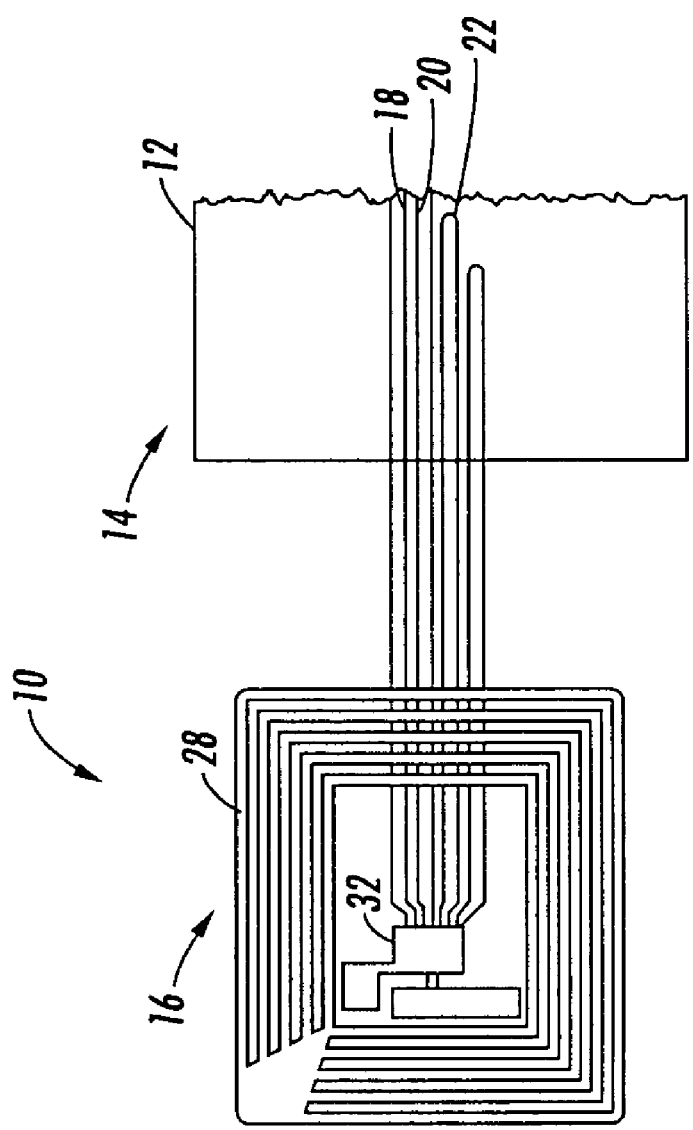
FIG. 2 is a similar view of the device showing a part of the component worn down to a level that exposes at least one of the sensor elements.

FIG. 2 shows the component 12 at the first stage or level of wear. At this stage, the circuit 18 is worn down and broken at the outer loop 17 while the other circuits 20 and 22 remain intact until later when broken in sequence by additional wear on the component 12.

The RFID tag 16 emits a different signal depending upon the degree of wear on the component 12. As the component 12 wears, the number of broken circuits increases and the signal emitted by the tag 16 changes to indicate the degree of wear during operation of the machine.

Figure 3:
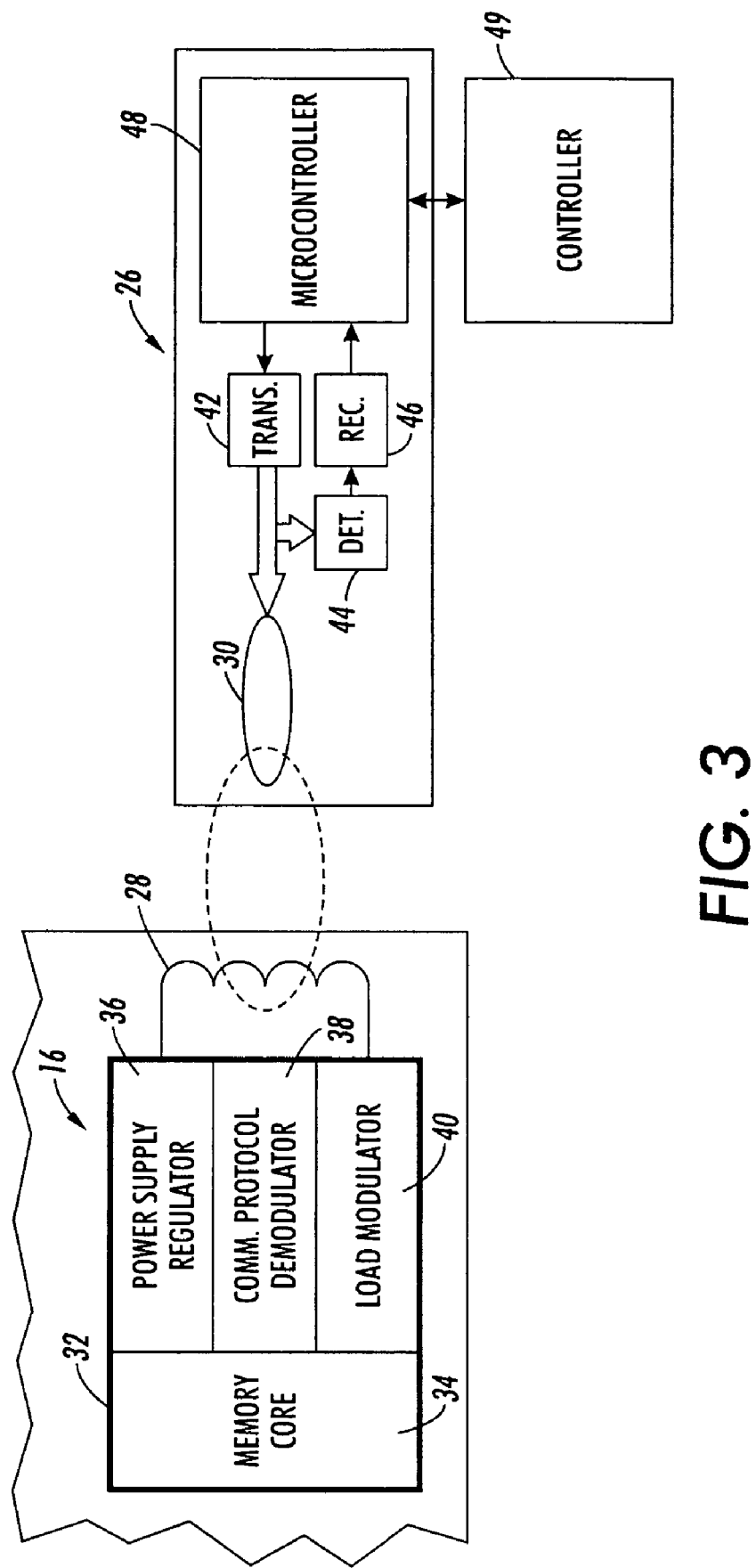
FIG. 3 is a schematical view of a RFID tag and associated reader or coupler.

FIG. 3 shows schematically a RFID system for wirelessly communicating data related to wear from the tag 16 to a reader 26. The tag 16 includes a tag antenna 28 which communicates with an antenna 30 on the reader 26. Within the tag 16, data storage and processing as well as radio frequency (RF) communications functions are typically performed by an integrated circuit chip 32, also known as a radio frequency identification chip. The chip 32 may include, for example, a memory core 34 (e.g., an EEPROM or flash memory), which stores the data, a power supply regulator 36, which rectifies and otherwise conditions alternating current induced in the antenna 28 by a time-varying RF signal provided the reader antenna 30 for use in the tag 16 as a direct current power source, and receiver/emitter modules 38, 40 (e.g., compatible with the ISO 14443 standard).

The reader 26 includes a transmitter 42 that generates the time-varying RF signal transmitted by the antenna 30. As a result of electromagnetic coupling between the tag antenna 28 and the reader antenna 30, a portion of the RF signal transmitted by the tag antenna 28 enters the reader antenna 30 and is separated from the transmitted signal by a detector 44 (e.g., an envelope detector). The separated signal is passed to a receiver 46, where it is amplified, decoded and presented via a microcontroller 48 to a controller 49, which may be a host computer for example.

In operation, component 12 begins to wear during normal use of the machine. After a period of time, the wear continues down to the longest circuit 18 and breaks at its outer closed loop 17, opening the circuit and creating data that is stored in the RFID tag 16.

The antenna 28 on the RFID tag 16 receives incoming data signals superimposed on the modulated carrier signal, which is provided by the antenna 30 on the reader 26. In response to the incoming data signals, the tag superimposes data from the IC device onto the carrier signal by changing its own circuit impedance. In some tags, such as in the present case, known as passive tags, the carrier signal is used to provide operating power for the tag.

The electronic reader 26 forms an interface between the tag 16 and the controller 49 which may be a host computer. The microcontroller 48 within the reader 26 along with associated circuitry allows the reader 26 to communicate with both the RFID tag 16 and the controller. Typically, there is a predefined command set used by the host computer to control the reader 26, which passes the commands to the RFID tag 16 via the modulated carrier signal. The reader generates the modulated carrier signal to transmit data to the tag, and receives data from the tag by detecting the loading effects of the tag on the carrier signal.

The RFID tag 16 can be connected to the embedded sensor device 10 by any conventional means. A monitoring device built into the machine and controller 49 may be employed to periodically poll the sensor device and report data related to wear of the component 12. The circuits 18, 20 and 22 wear through and break as the component 12 continues to wears out, and the RFID tag 16 will return different data depending on the state of that wear. Once the component 12 is very close to failure, as indicated to the reader 26, a technician can be called to replace the component. It will be seen that the present monitoring system reduces the amount of time the technician would need to be on call and would reduce the time required to troubleshoot problems.

In a sensor having three circuits, 18, 20 and 22, of varying lengths, the device would emit three distinct warnings. The first warning occurs when the longest circuit 18 is worn down to a point where it is broken, causing a signal to be emitted indicating component 12 will soon need to be changed.

If the worn component 12 is not replaced at this time, and use of the machine proceeds, component 12 will continue to wear down to the intermediate circuit 20. Once circuit 20 is broken, a second warning will occur, indicating the component 12 is nearing failure.

As the wear on component 12 continues, circuit 22, the shortest circuit will break, issuing a final warning indicating that machine failure is eminent. This is the final opportunity to replace the worn component 12 before total failure of the machine.

Although the monitoring device 10 has been described herein as employing a sensor 14 composed of a plurality of circuit elements 18, 20 and 22, it is contemplated that the device may also employ a single circuit forming a closed loop embedded within the component 12 which is similarly connected electrically to an RFID tag 16 and an associated reader 26.

The sensor circuits 18, 20 and 22 may be made from any electrically conductive material such as a metal wire, for example, and may be connected directly to the tag 16 by any conventional means. Preferably, the circuits are embedded within the component 12. In the case where the component 12 is made from an electrically non-conductive material such as a plastic material, the circuits may be formed integral with the component during its manufacture. In the case where the component 12 is electrically conductive, such as where the component is made from a metal, the sensor circuits 18, 20 and 22 may be installed by drilling elongated holes partially into the metal component and than inserting the circuit wires into the holes to the required depth. The circuits may then be secured in place suitably by an adhesive. The circuits could also be made from conductive wires having an insulating coating. The circuits 18, 20 and 22 may also be attached mechanically to the component 12 using a clamping mechanism, for example.

Although the component 12 shown in FIGS. 1 and 2 is depicted as having a generally rectangular shape with a substantially flat surface which is subject to wear, the monitoring device disclosed herein is not limited to use with objects or parts of that particular shape or configuration but is broadly applicable to any shaped object or part including spherical objects, for example, or other such objects having surfaces that are curved or arcuate, such as round tubes, pulleys and rollers as well as generally flat objects such as belts which are flexible and assume a curved or arcuate shape while running around or through pulleys of various arrangements.

Figure 4:
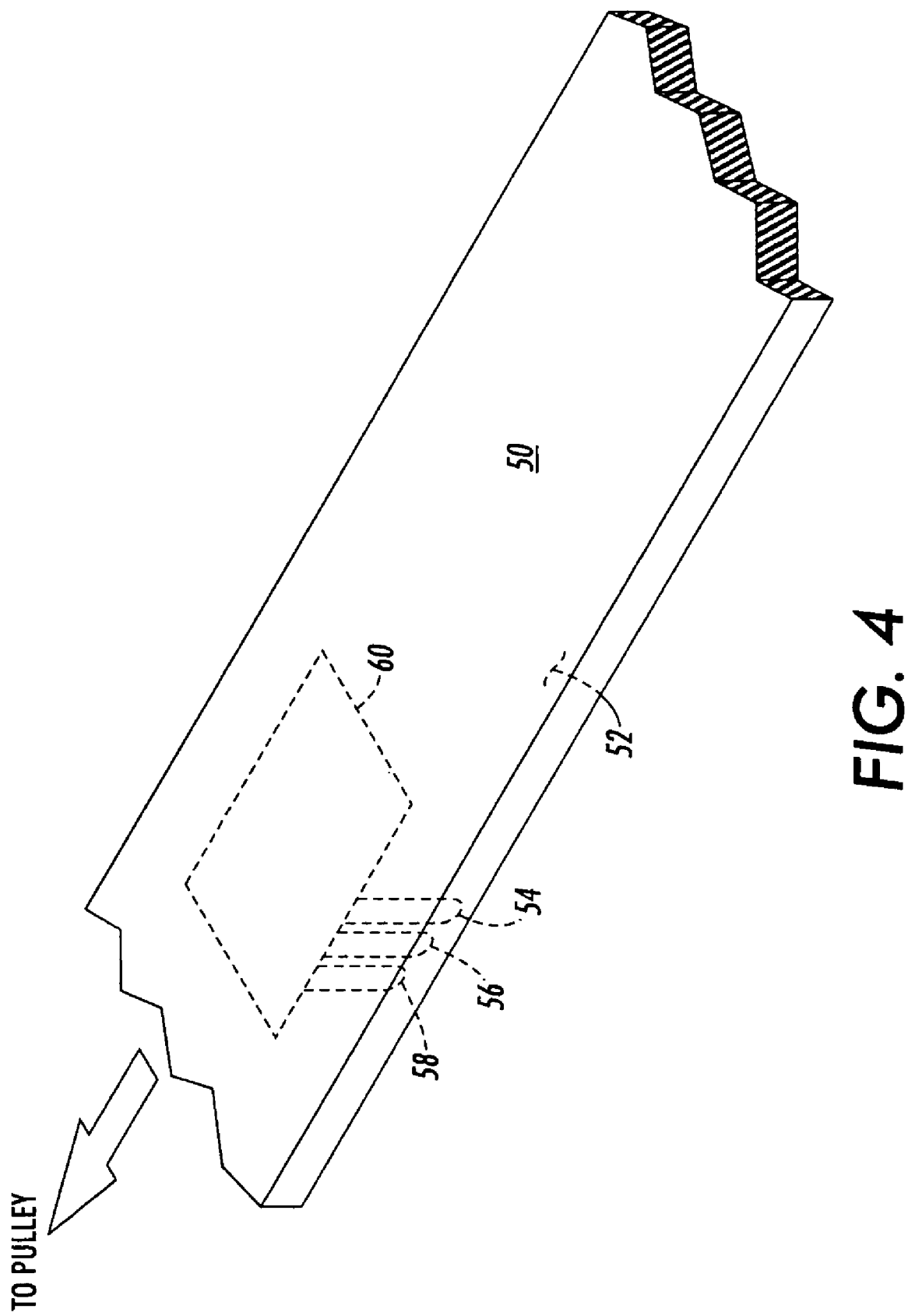
FIG. 4 is a perspective view of a belt incorporating wear sensors.

FIG. 4, for example, shows a rotating belt 50 incorporating a wear monitoring device similar to that shown in FIGS. 1 and 2. The belt 50 is made of a flexible material and has its underneath or bottom surface 52 exposed to wear as the belt passes around a pulley (not shown), for example. Sensor circuits 54, 56 and 58 are embedded into the cross-section of the belt 50 at different depths or levels to monitor various stages of wear. As belt 50 is rotating, wear begins on the bottom surface 52. As the wear continues, the longest sensor circuit 54, which is closest to the surface 52, will be the first to be exposed. Eventually, if the belt is not replaced and use of the machine continues, the wear will continue to expose the second sensor circuit 56 and finally the shortest sensor circuit 58, which is farthest from the surface 52, will also break. An RFID tag 60 may be affixed or printed onto the surface of the belt 50 and each sensor circuit 54, 56 and 58 is electrically connected to the tag 60 in essentially the same manner as described herein above. The RFID tag 60 can be read to determine the state of wear on the belt at periodic intervals using a tag reader that may be a hand-held device or a fixed reader associated with the machine employing the belt.

The monitoring device 10 is applicable for use in many different types of machines employing parts subject to wear. In particular, the monitoring device 10 is useful in a printing apparatus such as a digital printer, digital copier, bookmarking machine, facsimile machine, multi-function machine and the like.

Figure 5:
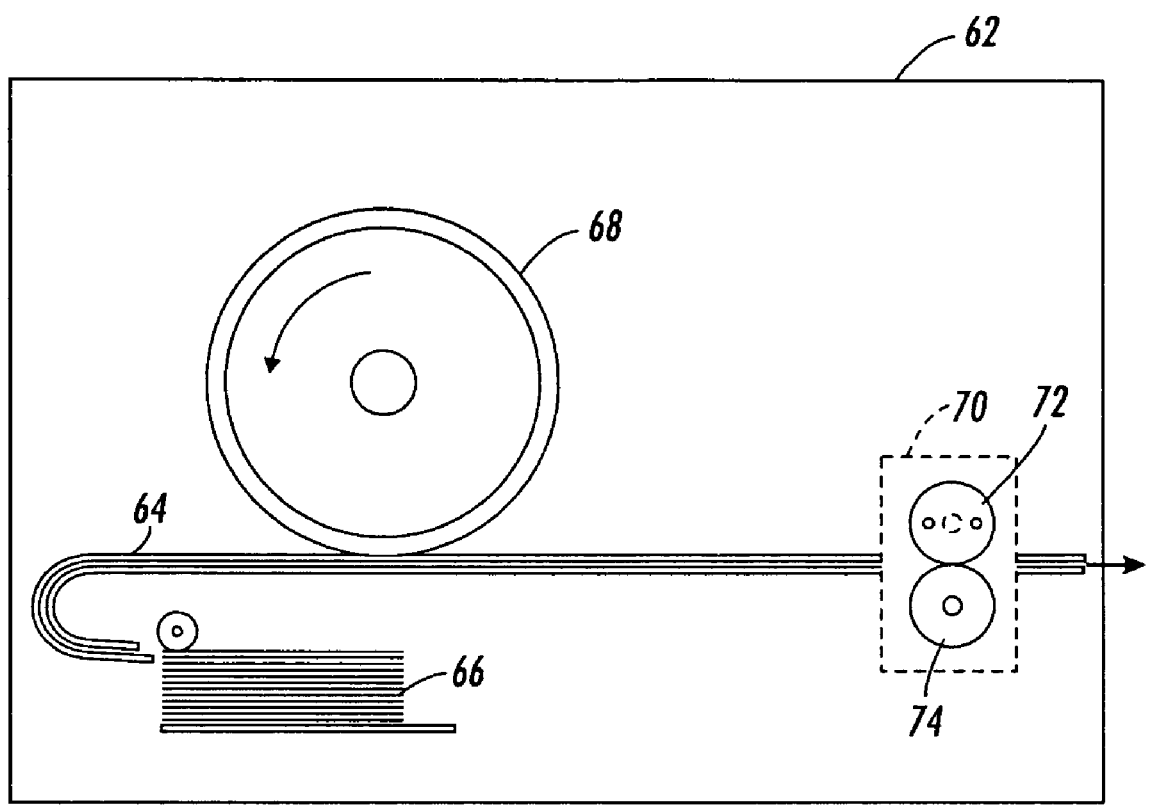
FIG. 5 is a schematical view of a printing apparatus employing a fuser roller equipped with a plurality of wear sensors.

One such machine or printing apparatus is shown in FIG. 5. Basically, the printing apparatus 62 is of the type disclosed and claimed in U.S. Pat. No. 6,661,989 issued to Pitts et al. on Dec. 9, 2003, which is incorporated by reference herein in its entirety, and includes mechanisms which draw substrates 64, such as sheets of paper, from a stack 66 and cause each sheet to obtain a toner image from the surface of a charge receptor 68.

The toner image is transferred from the charge receptor 68 to the sheet 64 by a transfer corotron, and the sheet is detached from the surface of the charge receptor 68 by a detack corotron. Once a particular sheet obtains marking material from charge receptor 68, the sheet is caused to pass through a fusing apparatus such as generally indicated as 70.

Depending on a particular design of a printing apparatus, fusing apparatus 70 may be in the form of a fuser module which can be readily removed and installed, in modular fashion, from the larger apparatus 62.

A typical design of the fusing apparatus 70 includes a fuser roller 72 and a pressure roll 74. Fuser roller 72 and pressure roller 74 cooperate to exert pressure against each other across a nip formed therebetween, both being subject to wear. When a sheet passes through the nip, the pressure of the fuser roller 72 against the pressure roller 74 contributes to the fusing of the image on a sheet. Fuser roller 72 further includes means for heating the surface of the fuser roller 72, so that heat can be supplied to the sheet in addition to the pressure, further enhancing the fusing process. Typically, the fuser roller 72, having the heating means associated therewith, is the roll which contacts the side of the sheet having the image desired to be fused.

Figure 6:
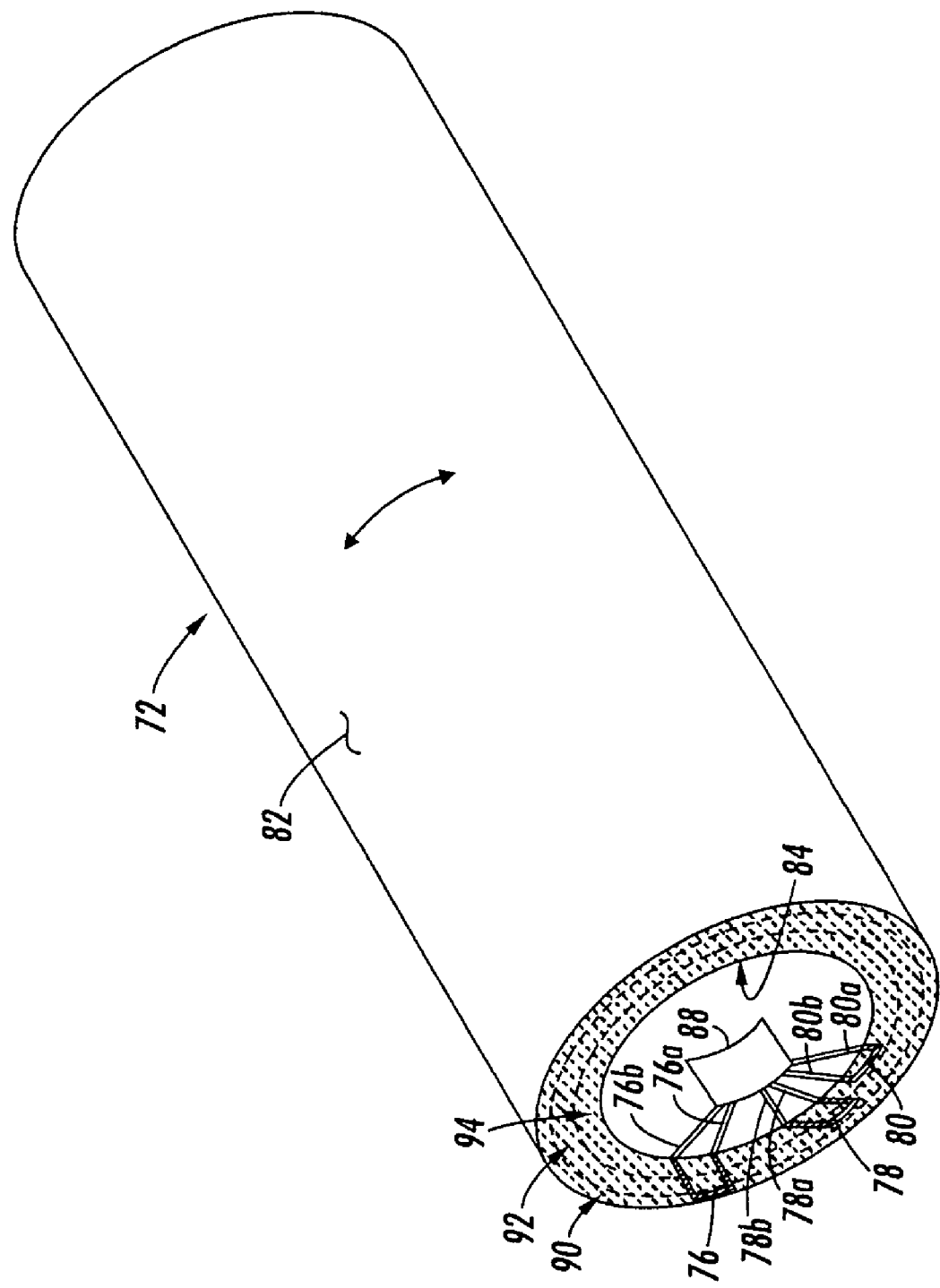
FIG. 6 is an enlarged perspective view of the fuser roller shown in FIG. 5.

FIG. 6 shows the finer roller 72 in greater detail, equipped wit a plurality of sensor elements similar to those shown in FIGS. 1 and 2. Circuits or loops 76, 78 and 80 are embedded into the cross-section of the roller 72 at different levels below its outer surface 82 and extend inwardly towards the inner surface 84 to monitor various stages of wear. As roller 72 rotates, the outer surface 82 will begin to wear as the roller presses against the pressure roller 74. Sensor circuit 76 is the longest circuit located closest to the outer surface 82 of roller 72 and will be the first circuit to be broken, sending an initial warning. Sensor circuit 80 is the shortest circuit embedded furthest from the outer surface 82 and will be the last to be exposed and broken, acting as a final warning circuit. The roller 72 may incorporate an RFID tag on its inner surface 84 such as shown at 88. The tag may be connected to the individual sensor circuits or loops 76, 78 and 80 via extensions 76a, 76b, 78a, 78b, and 80a, 80b, respectively, using conventional methods such as by lead wires (not shown) or the like.

As shown in FIG. 6, the fuser roller 72 may be constructed, at least in part, by a multiplicity of electrically non-conductive layers or rings 90, 92 and 94, only a few of which are shown for purposes of illustrations. The rings 90, 92 and 94 are built one upon another and form the plurality of conductive circuits or loops 76, 78 and 80 by doping adjacent portions of the rings with a conductive substance, such as an organic polymer, containing particles of a conductive material. The lead extensions 76a, 76b, 78a, 78b and 80a, 80b may be made of metal conductors, e.g., metal strips or wires, one end of which is embedded within the innermost layer 94 in electrical contact with the respective circuits 76, 78 and 80 formed by doping each layer as explained above. Thus, it will be seen that the circuits or loops 76, 78 and 80 can be readily deposited at different levels throughout the cross-section of the roller 72 so that they can be used to monitor various stages of wear. The sensor circuits 76, 78 and 80 are composed of the same material as the roller 72, except that they are made conductive by doping, so that wear of the sensing circuits is consistent with the wear of the roller itself.

Figure 7:
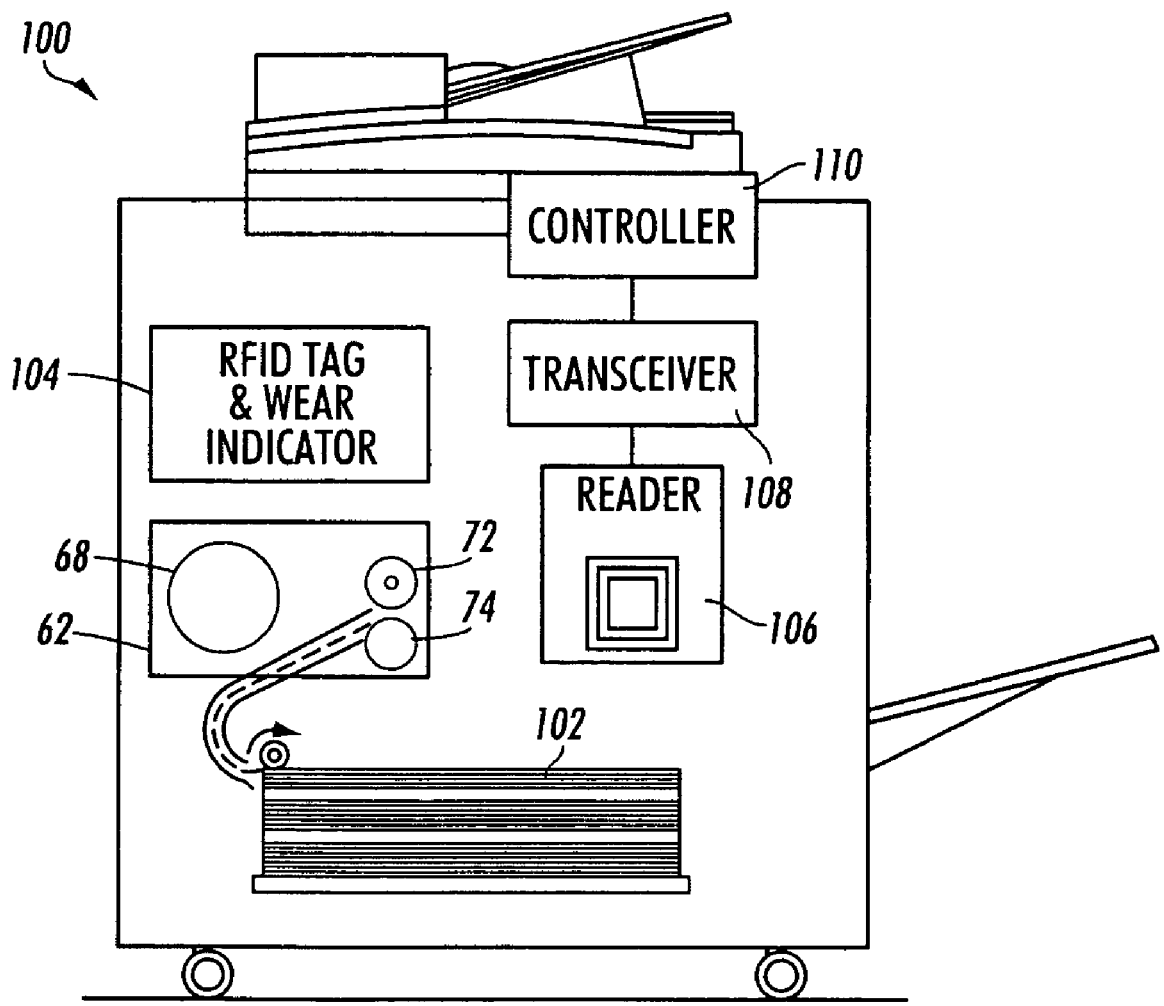
FIG. 7 is a schematical view of an electrostatographic printing apparatus incorporating a fuser roller equipped with wear sensors and an RFID tag along with an RFID reader and a transceiver communicating with the reader.

FIG. 7 schematically depicts an electrostatographic printing or copying machine 100 including the fuser apparatus 62 having a fuser roller 72 equipped with a wear sensing device such as disclosed and shown in FIGS. 5 and 6. In operation, sheets on which images are to be printed are drawn from a stack 102 and passed through the fuser apparatus 62 where a latent image is produced on the sheets by the charge receptor 68. The sheets then pass through the fuser and pressure rollers 72, 74 whereupon the image is fused to the sheets. The fuser roller 72 is equipped with a monitoring device including sensor circuits 76, 78 and 80 (see FIG. 6) and an RFID tag 88, both of which are represented schematically by the block 104.

A reader or coupler 106 is mounted in the machine 100 in close proximity to the RFID tag 88 on the fuser roller 72 and is able to periodically read data relative to wear of the roller via the sensor circuits 76, 78 and 80. A transceiver 108 or other two-way transmitting/receiving, communication device may be employed to direct the data taken by the reader or coupler 106 to a controller 110. The controller 110 may be employed to program the reader or coupler 106 to periodically collect the wear data and other information from the RFID system including the tag 88 and sensor circuits 76, 78 and 80.

What is claimed is:

1. A device for monitoring wear in a component, comprising:
   a radio frequency identification chip attached to the component; and
   a sensor configured to monitor wear of the component, said sensor being in communication with said radio frequency identification chip, said sensor including one or more circuits each having a separate set of conductors for connection to said radio frequency identification chip.

2. A device for monitoring wear on the surface of a component comprising:
   a radio frequency identification chip attached with the component; and
   a sensor including at least one circuit disposed at a predetermined distance below said surface, said sensor being in communication with said radio frequency identification chip,
   wherein each of said circuits has a separate set of conductors for connection to said radio frequency identification chip, and
   said at least one circuit wears as the component wears and breaks as the component is worn through.

3. A device according to claim 2, wherein said sensor is integral to the component.

4. A device according to claim 3, wherein said sensor includes a plurality of circuits each of which is disposed at a different distance below said surface.

5. A device according to claim 4, wherein the number of said circuits that break increases as the component wears.

6. A device according to claim 5, wherein said radio frequency identification chip transmits signals based on the number of said circuits that have broken.

7. A device according to claim 6, wherein said signals change as a result of the number of said circuits that have broken changes.

8. A device according to claim 6, wherein each of said circuits is independently connected to said radio frequency identification chip through a unique electrical conductor.

9. A device for monitoring wear on the surface of a component, comprising:
   a radio frequency identification chip attached with the component; and
   a sensor including circuits of varying lengths disposed within said component at different distances below said surface, said sensor being in communication with said radio frequency identification chip, wherein each of said circuits has a separate set of conductors for connection to said radio frequency identification chip, and each of said circuits wears as the component wears and each of said circuits breaks after another of said circuits is worn through.

10. A device according to claim 9, wherein said radio frequency identification chip transmits signals based on the number of said circuits that have broken.

11. A device according to claim 10, wherein the number of said circuits that have broken increases as the component wears.

12. A device according to claim 11, wherein said signals change as a result of the number of said circuits that have broken changes.

13. A device according to claim 9, wherein each of said circuits is independently connected to said radio frequency identification chip through an electrical conductor unique to each of said circuits.

14. A device for monitoring wear on the surface of a component, comprising:

a radio frequency identification chip attached to the component; and a sensor including a first, second and third circuits disposed within said component, said first circuit being closest to said surface, said third circuit being farthest from said surface and said second circuit being at a distances below said surface intermediate that of said first and third circuits, said first, second and third circuits being separate conducting loops, said sensor being in communication with said radio frequency identification chip, wherein said first circuit is the first to wear and break, said second circuit is the next to wear and break and said third circuit is last to wear and break as said component wears.

15. A device according to claim 14, wherein said radio frequency identification chip transmits signals based on which of said first, second or third circuit has broken.

16. A device according to claim 14, wherein said first, second and third circuits are independently connected to said radio frequency identification chip through separate electrical conductors.

\* \* \* \* \*